(12) United States Patent
Wiese et al.

(10) Patent No.: US 11,294,558 B2
(45) Date of Patent: Apr. 5, 2022

(54) INTERACTIVE USER INTERFACE FOR REGRESSION SYSTEMS THAT PROCESS DISTORTED OR ERRONEOUS DATA OBTAINED FROM AN ENVIRONMENT

(71) Applicant: ERNST & YOUNG GMBH WIRTSCHAFTSPRÜFUNGSGE SELLSCHAFT, Stuttgart (DE)

(72) Inventors: Michael Wiese, Essen (DE); Ludwig Mochty, Essen (DE)

( * ) Notice: Subject to any disclaimer, the term of this patent is extended or adjusted under 35 U.S.C. 154(b) by 0 days.

(21) Appl. No.: 17/055,841

(22) PCT Filed: May 15, 2019

(86) PCT No.: PCT/EP2019/062548
§ 371 (c)(1),
(2) Date: Nov. 16, 2020

(87) PCT Pub. No.: WO2019/219786
PCT Pub. Date: Nov. 21, 2019

(65) Prior Publication Data
US 2021/0232302 A1     Jul. 29, 2021

(30) Foreign Application Priority Data

May 16, 2018    (EP) ..................................... 18172581

(51) Int. Cl.
*G06F 9/451*     (2018.01)
*G06F 3/04847*    (2022.01)

(52) U.S. Cl.
CPC .......... *G06F 3/04847* (2013.01); *G06F 9/451* (2018.02)

(58) Field of Classification Search
CPC ................ G06F 3/04847; G06F 9/451; G06Q 10/06395; G06Q 10/0637
See application file for complete search history.

(56) References Cited

U.S. PATENT DOCUMENTS

| 5,727,128 A | * | 3/1998 | Morrison | ............... | G05B 17/02 706/45 |
| 2003/0149501 A1 | * | 8/2003 | Tuszynski | ........ | G05B 19/41865 700/97 |
| 2011/0276828 A1 | * | 11/2011 | Tamaki | .............. | G05B 23/0254 714/26 |

(Continued)

*Primary Examiner* — Daniel W Parcher
(74) *Attorney, Agent, or Firm* — RC Trademark Company (57) ABSTRACT

Disclosed is an interactive user interface of a regression planning and evaluation system, wherein regression planning and evaluation system is employed to obtain audit evidence. The audit evidence is obtained based on input data pertaining to given use case. The interactive user interface comprises: (i) an input interface element that enables user to input audit parameters; and (ii) an output interface element that enables the regression planning and evaluation system to present to user: (a) a regression plot representing a variation of target variable with respect to an explanatory variable, wherein the regression plot indicates an upper and a lower acceptance bounds with respect to regression line, and wherein the regression plot is generated for a plurality of samples based upon input data and audit parameters; and (b) key items, wherein key items are identified as samples that fall outside the upper acceptance bound and the lower acceptance bound in regression plot.

8 Claims, 5 Drawing Sheets

(56) References Cited

U.S. PATENT DOCUMENTS

| | | | | |
|---|---|---|---|---|
| 2013/0262348 A1* | 10/2013 | Kiran | ............... | G06N 5/02 |
| | | | | 706/11 |
| 2014/0052423 A1* | 2/2014 | Mun | ............... | G06F 7/60 |
| | | | | 703/2 |
| 2014/0304390 A1* | 10/2014 | Bates | ............... | H04L 41/147 |
| | | | | 709/224 |
| 2018/0060149 A1* | 3/2018 | Flyax | ............... | G06F 11/0751 |
| 2019/0012553 A1* | 1/2019 | Maruchi | ............... | G06K 9/6288 |

* cited by examiner

INTERACTIVE USER INTERFACE FOR REGRESSION SYSTEMS THAT PROCESS DISTORTED OR ERRONEOUS DATA OBTAINED FROM AN ENVIRONMENT

TECHNICAL FIELD

The present disclosure relates generally to interactive user interfaces for use with regression systems, wherein the systems process distorted or erroneous data (namely information) obtained from an environment, wherein the systems are implemented using computing hardware, and wherein the interactive user interfaces provide improved man-machine interaction when performing complex computation tasks associated with correcting distorted or erroneous data obtained from an environment when providing, for example, auditing evidence. The systems in combination with the interactive user interfaces provide benefits of improved processing of distorted or erroneous input data obtained from an environment, for example input data obtained from at least one of: sensors, manual input data, databases; the systems identify such distortions and errors in the input data, and then optionally initiate various steps to try to improve the input data to reduce an effect of the distortions and errors. Moreover, the present disclosure relates to methods that are implemented using the aforesaid systems, wherein the methods include processing the input data to identify distortions and errors therein, and then implementing one or more actions to address the distortions and errors. The systems and methods are applicable to processing genetic DNA readout data, audio and visual signal data, as well as captured sensor data, auditing records and such like, or any combination thereof. For example, the one or more actions can include obtaining more sensor signals, retesting an apparatus, collecting more auditing data and such like. Moreover, the present disclosure also relates to software products comprising non-transitory machine-readable data storage mediums having stored thereon program instructions, the program instructions being accessible by a processing device to execute the aforementioned methods.

BACKGROUND

Computer-implemented systems that process input data and apply mathematical algorithms to analyse distortions and inaccuracies in the input data to generate corresponding output data that is less encumbered by the distortions and inaccuracies are known. For example, granted patents EP097046B1 and GB2334015B ("Speech Analysis System", The Secretary of State for Defence) describe computer-implemented systems that receive input data representative of audio signals in a telephone system, and process the input data to determine distortions therein and then apply processing to the input data to correct for the distortions to render the audio signals more intelligible. The computer-implemented systems execute software that does not alter a manner in which computing hardware of the computing-implemented systems operate. Moreover, in a granted United Kingdom patent GB2559437B ("Prenatal Screening and Diagnostic System and Method", Congenica Ltd.), there is described a computer-implemented system that receives DNA readout data and processes the DNA readout data to determine errors therein, and applies a correction to the DNA readout data to correct for errors; the errors arise, for example, due to ambiguities and stochastic variations that occur when performing high-speed (PCR) genetic information readout from biological genetic samples.

Various configurations of data encoders and decoders are described in many recently granted European and United Kingdom patents, wherein the encoders and decoders are implemented using software executing on standard computing hardware that is arranged to execute one or more software products for implementing the encoders and decoders. The software does not change in any way a manner in which the computing hardware operates, but merely causes a change in entropy of data that is processed through the computing hardware; in such cases, a change of entropy of data when processed through the computing hardware is regarded as being a further technical effect, even when the data being processed may potentially be of synthetic origin (for example text files, computer-generated graphics files and so forth).

From the foregoing, it will be appreciated that exclusions to patentability arising from the Strasbourg Convention (enshrined in Art 52(2) EPC and TRIPs) have to be construed very narrowly, relating to excluded subject matter as such only, otherwise the aforementioned granted patents would be totally inconsistent. The present invention relates to systems and methods that can be applied to input data, whether derived from sensors, manual data input or pre-recorded in one or more databases.

In recent times, several commercial enterprises such as manufacturing units, retailers, banks, money-lenders, currency exchangers, and the like have come into existence. These enterprises generally perform several financial and non-financial operations, and therefore, are required to maintain detailed records pertaining thereto. However, such records need to be verified for accuracy, precision and reliability, by a procedure known as an "audit". Typically, audits involve detailed analysis and inspection of records of a given enterprise's financial and non-financial operations. Furthermore, such audits need to be done regularly in order to maintain reliable financial records, prevent frauds and improve credibility of the given enterprise.

Generally, the audit is performed by a person (commonly known as an "auditor") having knowledge of accounting, business administration, auditing, and the like. For efficiently performing the audit, the auditor generally performs audit planning before starting the audit. The audit planning includes two steps, one of assessing risk of material misstatement, and one of responding to those risks by obtaining audit evidence. Notably, such audit planning helps in development of appropriate audit strategies which need to be subsequently executed by the auditor. Therefore, the audit planning operation forms a crucial part of the audit.

However, there currently exist several issues associated with obtaining audit evidence. As an example, sources of information having as diverse and comprehensive nature as that of audit evidence, are disparate and often distributed. Therefore, aggregating and systematically organizing information from such sources poses a significant challenge pertaining to data acquisition and data recording. Providing computing hardware that is specifically configured to be able to collate and process data from disparate and often distributed sources, and subsequently, represent such data, is a technical problem associated with known technical art.

Presently, several analytical methods and conventional computing devices are being used by the auditor for obtaining audit evidence. Since such analytical methods are computationally intensive, (i) organisation of the records that need to be analysed, (ii) representation of the records that need to be analysed, and (iii) user-friendly representation of results that are obtained upon implementing the analytical methods, are extremely important to ensure accuracy and time-efficiency of such analytical methods. Specific implementations of computing devices for aggregating and systematically representing information from disparate sources represents a technical problem that is contemporarily inadequately addressed.

Existing hardware resources that are employed by the auditors for implementing such analytical methods lack means for properly organizing and representing the records that need to be analysed. As a result, it is often difficult for the auditor to view such records and derive inferences therefrom. Also, existing hardware resources lack provisions for presenting results that are obtained upon processing such records, in a user-friendly manner. In other words, representation of obtained audit evidence is currently sub-optimal, and is often not easily comprehensible to the auditor. Furthermore, there currently exist very limited provision for customization of the results as per the auditor's preference.

Therefore, in light of the foregoing discussion, there exists a need to overcome the aforementioned drawbacks associated with interactive user interfaces that support managing and representing data records that need to be analysed via audit planning procedures.

SUMMARY

The present disclosure seeks to provide an improved interactive user interface for a regression planning and evaluation system that is to be employed for obtaining audit evidence from an environment, wherein the audit evidence is generated from input data that is potentially distorted or erroneous.

The present disclosure seeks to provide a solution to the existing problems associated with interactive user interfaces that provide for representation of records and processed information pertaining to analytical techniques for obtaining audit evidence. An aim of the present disclosure is to provide a solution that overcomes, at least partially, the problems encountered in prior art, and to provide a user-friendly and customisable user interface that enables proper visual representation of records that need to be analysed for obtaining audit evidence.

In one aspect, the present disclosure provides an interactive user interface of a regression planning and evaluation system, wherein the regression planning and evaluation system is employed, when in operation, to obtain audit evidence, and wherein the audit evidence is obtained based upon input data pertaining to a given use case, characterized in that the interactive user interface comprises:

(i) at least one input interface element that enables the user to input a plurality of audit parameters to be employed for the audit evidence; and (ii) at least one output interface element that enables the regression planning and evaluation system to present to the user:

(a) a regression plot representing a variation of a target variable with respect to at least one explanatory variable, wherein the regression plot indicates an upper acceptance bound and a lower acceptance bound with respect to a regression line, and wherein the regression plot is generated for a plurality of samples associated with the given use case based upon the input data and the plurality of audit parameters; and (b) key items, wherein the key items are identified as samples that fall outside the upper acceptance bound and the lower acceptance bound in the regression plot.

The invention is of advantage in that use of acceptable bounds associated with a regression computation controlled via the interactive user interface enables distortions or inaccuracies (for example inconsistencies) in the input data obtained from the environment to be identified, and, for example, portions of the input data corresponding to the distortions or inaccuracies to be improved (for example by performing resampling, or acquiring further measurements or sensor data) to provide a higher degree of audit evidence. The audit evidence is potentially useable for quality assurance, for reliability assurance and for determining robustness.

The interactive user interface for the regression planning and evaluation system is implemented on hardware systems which include component parts that are specially adapted to perform regression computation in a computationally efficient manner. For example, the hardware systems are optionally reconfigurable depending on regression computations being performed; for example, such reconfigurability includes allocating data memory and data processors of a mufti-processor reduced instruction set (RISC) arrangement to various regression computations required by detected data distortions or inaccuracies present in the input data to the system.

Embodiments of the present disclosure substantially eliminate or at least partially address the aforementioned problems in the prior art, and enables user-friendly representation of information, whilst obtaining audit evidence.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides an interactive user interface of a regression planning and evaluation system, wherein the regression planning and evaluation system, when in operation, is employed to obtain audit evidence, and wherein the audit evidence is obtained based upon input data pertaining to a given use case, characterized in that the interactive user interface comprises:

(i) at least one input interface element that enables the user to input a plurality of audit parameters to be employed for the audit evidence; and (ii) at least one output interface element that enables the regression planning and evaluation system to present to the user:

(a) a regression plot representing a variation of a target variable with respect to at least one explanatory variable, wherein the regression plot indicates an upper acceptance bound and a lower acceptance bound with respect to a regression line, and wherein the regression plot is generated for a plurality of samples associated with the given use case based upon the input data and the plurality of audit parameters; and (b) key items, wherein the key items are identified as samples that fall outside the upper acceptance bound and the lower acceptance bound in the regression plot.

The present disclosure provides the aforementioned interactive user interface for the regression planning and evaluation system. The interactive user interface allows for obtaining inputs from the user and providing user-friendly, systematic, easily comprehensible, and customisable representations of information to the user. As a result, the interactive user interface facilitates the user in better organization, viewing, analysis, and processing of information whilst obtaining audit evidence. By providing the interactive user interface, the regression planning and evaluation system enables the user to conveniently view aggregated data from disparate information sources, as well as results that are obtained upon processing such data. Furthermore, the interactive user interface described herein can be easily implemented by way of the hardware system of the regression planning and evaluation system. Moreover, the regression planning and evaluation system, on detecting a regression whose results are not bounded within thresholds, optionally causes the system to seek further input data to resolve such a regression deviation, thereby reducing distortions or inaccuracies in the input data, for example for auditing evidence purposes.

It will be appreciated that the aforesaid regression planning and evaluation system is not limited to obtaining the audit evidence for only a single use case, and can be employed to obtain audit evidences for a plurality of use cases (namely, multiple use cases). In such a case, separate interactive user interfaces are implemented for each use case of the plurality of use cases. For example, the audit can relate to monitoring or operation of a manufacturing facility, wherein the input data is obtained from measurement equipment and sensor arrangements that are used to monitor technical processes of the manufacturing facility, and that the audit evidence generated by the system is employed for quality assurance of for ensuring safety of operation of the manufacturing facility. For example, the manufacturing facility optionally relates to a Silicon Carbide encapsulation facility for handling nuclear waste from a nuclear reprocessing facility (for example, Sellafield) and that the audit evidence from the system is required for environmental safety reasons.

Optionally, the regression planning and evaluation system comprises a server arrangement that is configured to implement a method of obtaining audit evidence. Throughout the present disclosure, the term "server arrangement" relates to an arrangement of at least one server that, when operated, performs the method of obtaining the audit evidence.

In one embodiment, the regression planning and evaluation system is automated (namely, fully autonomous). In another embodiment, the regression planning and evaluation system is semi-automated (namely, semi-autonomous). In yet another embodiment, the system switches periodically between semi-automated and fully automated modes of operation.

Throughout the present disclosure, the term "audit evidence" relates to all information (such as the records of the given establishment's financial and non-financial operations, information pertaining to the given establishment from other sources, physical measurement data from a manufacturing facility, camera image data and the like) that is utilised by the user to form an audit conclusion. The audit conclusion is not limited to financial conclusions, but can also relate to environmental safety conclusions and so forth.

Optionally, the user is a person having knowledge pertaining to at least one of: finance, accounting, business administration, auditing, manufacturing, materials reprocessing, mining and so forth. Optionally, in this regard, the user is an independent auditor, an internal auditor employed by an entity being audited, or an auditor employed by at least one firm offering audit services. Such an auditor may or may not be certified by at least one regulatory authority of auditing.

For illustration purposes only, there will now be considered an exemplary network environment, wherein the regression planning and evaluation system is implemented pursuant to embodiments of the present disclosure. The exemplary network environment may include a source of the input data pertaining to the given use case, a user device associated with the user of the regression planning and evaluation system, the server arrangement including the at least one server, and a communication network. Notably, the server arrangement is coupled in communication with the source of the input data either directly, or via the communication network. Furthermore, in the exemplary network environment, the server arrangement may be coupled in communication with the user device via the communication network. In such a case, the user device can be understood to be the "client" for the server arrangement. It is to be noted here that the server arrangement could be coupled in communication with a plurality of user devices associated with a plurality of users. Examples of the user device include, but are not limited to, a mobile phone, a smart telephone, a Mobile Internet Device (MID), a tablet computer, an Ultra-Mobile Personal Computer (UMPC), a phablet computer, a Personal Digital Assistant (PDA), a web pad, a Personal Computer (PC), a handheld PC, a laptop computer, a tablet computer, and a desktop computer.

It will be appreciated that the aforementioned server arrangement can be implemented in several ways. In an example, the entire server arrangement is directly coupled in communication with a given user device associated with a given user, via the communication network. In such a case, the entire server arrangement can be accessed by the given user using the given user device, via the communication network. In another example, the server arrangement has a distributed architecture, wherein the server arrangement comprises a plurality of servers that are coupled in communication with a given user device associated with a given user, via the communication network. In such a case, there can be a first server (namely, a "front-end server") that is directly coupled in communication with the given user device, and at least one server (namely, at least one "back-end server") that is coupled in communication to the first server. In operation, the first server can be accessed by the given user using the given user device, via the communication network. Furthermore, in such a case, the at least one back-end server, either alone, or in combination with the front-end server, implements the aforesaid steps (a) to (e). In yet another example, server arrangement is implemented by way of a cloud server arrangement. Such use of servers provides for more efficient regression computations when generating audit evidence.

Optionally, the server arrangement is coupled to a regression module coupled in communication with the server arrangement for performing regression computations; the regression module is beneficially implemented using custom computing hardware that is reconfigurable depending on a type of regression being executed on the regression module. More optionally, the regression module is implemented by employing a configuration of field-programmable gate arrays (FPGA's) and reduced instruction set (RISC) computers. Therefore, the regression module can be understood to be a custom computing hardware that is configured to perform the regression computations described throughout the present disclosure. Optionally, the regression module includes customized computing hardware that is dynamically reconfigured in response to types of regressions computations being performed in the regression module, for example selective allocation of different grades of data memory, and selective allocation of reduced instruction set computers (RISC) of an array processor depending on correlation computations that are executed in the regression module.

In an embodiment, the source of the input data is at least one entity device associated with an entity, the entity being associated with the given use case for which the audit evidence is to be obtained. Optionally, the entity is an organisation (namely, a firm or a company) being audited. Examples of the at least one entity device include, but are not limited to, a mobile phone, a smart telephone, a Mobile Internet Device (MID), a tablet computer, an Ultra-Mobile Personal Computer (UMPC), a phablet computer, a Personal Digital Assistant (PDA), a web pad, a Personal Computer (PC), a handheld PC, a laptop computer, a tablet computer, and a desktop computer. In another embodiment, the source of the input data is a database arrangement comprising at least one database, the database arrangement being configured to store thereupon, the input data pertaining to the given use case for which the audit evidence is to be obtained. Optionally, the database arrangement obtains the input data pertaining to the given use case for which the audit evidence is to be obtained, from the at least one entity device associated with the entity. In such a case, the database arrangement acts as a data repository whereat the input data is stored. It is to be understood that the term "database" generally refers to hardware, software, firmware, or a combination of these for storing information in an organized (namely, structured) manner, thereby, allowing for easy storage, access (namely, retrieval), updating and analysis of such information. The term "database" also encompasses database servers that provide the aforesaid database services to the automated or semi-automated regression planning and evaluation system.

Throughout the present disclosure, the term "input data" relates to disaggregated data pertaining to the given use case, such disaggregated data including the data values of the set of variables for (i) a portion of an entire population of financial and non-financial records associated with the given use case, or (ii) the entire population of financial and non-financial records associated with the given use case. As an example, if the entire population of financial and non-financial records associated with the given use case includes 1000 records (namely, 1000 samples), the input data may include the data values of the set of variables for (i) a portion of the entire 1000 records, for example, such as 350 records (namely, 350 samples), or (ii) the entire 1000 records (namely, 1000 samples). Furthermore, the set of variables can be understood to be attributes related to the given use case, and the data values of the set of variables provides financial and/or non-financial records related to the given use case.

As an example, a given use case UC may relate to sales for a given manufacturer. In such an example, the input data may relate to disaggregated data that includes data values of a set of eight variables V1-V8 for 30 shops at which items manufactured by the given manufacturer are sold. In other words, the input data may comprise the data values of the set of eight variables V1-V8 for 30 samples associated with the given use case. Furthermore, variable V1 may be rent, variable V2 may be sales, variable V3 may be selling area, variable V4 may be cost of sales, variable V5 may be inventory, variable V6 may be personnel cost, variable V7 may be total trade profit, and variable V8 may be number of customers. Moreover, the data values for a given variable, for example, such as the variable V2 may be £51,000; £94,000; £115,000; £103,000; £73,000; £101,500; £109,000; £84,000; £71,000; £118,000; £77,000; £61,500; £105,000; £95,000; £54,000; £121,500; £82,000; £52,000; £58,000; £98,000; £127,000; £88,000; £100,000; £112,000; £89,500; £100,000; £66,000; £125,000; £75,000; and £96,500. Similar data values (with or without units) may be obtained corresponding to other variables, for the 30 samples. However, it will be appreciated that the variables V1 to V8 can also relate to physical variables, for example measurements of physical parameters of a manufacturing facility.

Optionally, the interactive user interface is employed by the regression planning and evaluation system to present the obtained input data to the user. Optionally, in this regard, the at least one output interface element allows for presenting the obtained input data to the user. Optionally, at the interactive user interface, the obtained input data is represented in form of: a table, an image, or text.

It will be appreciated that the regression planning and evaluation system is configured to obtain an enormous amount of input data and systematically represent the obtained input data to the user via the interactive user interface in a clear ("concrete") and useful form. The obtained input data is represented to the user in a user-friendly manner. This allows the user to understand the input data more easily, and to draw logical inferences from the input data, which user would not be able to do mentally without computer-aided processing of the input data.

Optionally, the obtained input data is validated based upon a predefined set of statistical rules. Notably, the predefined set of statistical rules are employed to validate the input data according to at least one of: data type, data value, data structure, data consistency, data format, data accuracy, and data relevance. It will be appreciated that such validation of the input data allows for ensuring a planned precision level and a planned reliability level of the input data. Furthermore, the aforesaid validation operation can be performed by the server arrangement and/or the user of the regression planning and evaluation system. Optionally, the at least one output interface element enables the regression planning and evaluation system to present validated input data to the user. As an example, by way of the output interface element, the validated input data is presented in form of: a table, text, or a list.

Optionally, the predefined set of statistical rules include at least one of: arithmetic rules, logical rules, syntax rules, semantic rules, a data model of a manufacturing facility. As an example, an arithmetic rule may specify that data values of a given variable cannot exceed a predefined amount (namely, defines a threshold for the given variable, for example for distortion or inaccuracy detection purposes).

Optionally, the validated input data is reconciled. In such a case, the user compares the validated input data with the input data stored at the source of the input data, to identify irregularities and inconsistencies therebetween. Beneficially, such a reconciliation operation allows for substantially reducing errors associated with incorrect obtaining and validation of the input data. Optionally, the at least one output interface element presents to the user, a variable summary that facilitates the user to reconcile the validated input data to the source from where the input data was obtained. As an example, by way of the output interface element, the variable summary is presented in form of: a table, text, or a list.

It will be appreciated that the reconciliation operation is implemented using the customised processing hardware (namely, the regression module). The regression module is configured to perform efficiently and accurately reconciliation operations for a large amount of the input data in a very short period of time time. Such accurate reconciliation operation is not possible manually and/or with conventional known computing hardware.

Throughout the present disclosure, the term "interactive user interface" relates to an arrangement that allows for interaction between the user and the regression planning and evaluation system. Therefore, the term "interactive user interface" can also be referred to as a "human-machine interface". The interactive user interface is generally rendered upon a display screen of the user device and allows for the aforesaid regression planning and evaluation system to receive input(s) from and/or provide output(s) to the user. Notably, the interactive user interface optionally has a customisable aesthetic appearance.

The interactive user interface comprises the at least one input interface element and the at least one output interface element. Throughout the present disclosure, the term "input interface element" relates to an element (such as, an object) rendered upon the interactive user interface, that allows for the user to provide input(s) to the regression planning and evaluation system. Throughout the present disclosure, the term "output interface element" relates to an element rendered upon the interactive user interface, that allows for the regression planning and evaluation system to provide output(s) to the user.

Optionally, at the interactive user interface:
the at least one input interface element is implemented by way of at least one of: a user-selectable object, an input field, a slider; and
the at least one output interface element is implemented by way of at least one of: a table, a list, an image, text, a statistical representation. Examples of the user-selectable object include, but are not limited to, a user-selectable icon, a user-selectable button, a dropdown menu having a plurality of user-selectable options. Furthermore, examples of the aforesaid statistical representation include, but are not limited to, a bar graph, a histogram, a pie chart, a solar representation, a scatter plot, a line chart, and an area chart.

In an example scenario, the user may provide the input, via the at least one input interface element, by way of: clicking on (namely, selecting) the user-selectable object, entering a value in the input field, adjusting (namely, moving a cursor of) the slider, and the like.

In an embodiment, at the interactive user interface, the at least one input interface element and the at least one output interface element are rendered in a non-overlapping manner.

In another embodiment, at the interactive user interface, the at least one input interface element and the at least one output interface element are rendered in an overlapping manner. In such a case, the at least one input interface element and the at least one output interface element are rendered by way of a plurality of overlapping layers.

In yet another embodiment, the interactive user interface comprises a plurality of user interface tabs, wherein a given user interface tab includes the at least one input interface element and/or the at least one output interface element. Such a plurality of user interface tabs allow for providing the user with different views of the interactive user interface. The user can therefore utilise the plurality of user interface tabs whilst operating the interactive user interface.

Optionally, the interactive user interface enables the user to adjust a relative arrangement of the at least one input interface element and/or the at least one output interface element. Such an adjustment operation allows for the user to arrange the input and/or output interface element(s) according to his/her preference, thereby facilitating the user to view information pertaining to the audit evidence, in a desired manner. As an example, the at least one input interface element and/or the at least one output interface element may be arranged over the plurality of user interface tabs, the plurality of overlapping layers, and so forth. In such a case, the plurality of user interface tabs, overlapping layers and so forth, can be accessed by swiping, clicking, selecting and so forth. Furthermore, adjusting the relative arrangement of the at least one input interface element and/or the at least one output interface element over the plurality of overlapping layers, user interface tabs and so forth enhances the ability of the user to view the desired information as per his/her requirement.

In an example, the user may arrange the at least one input interface element and the at least one output interface element on a single user interface tab. In another example, the user may arrange all the output interface elements implemented by way of statistical representation on a single user interface tab, and all the input interface elements on another user interface tab. In yet another example, the user may arrange a layer of one input interface element to overlap another layer of another input interface element, and so forth. In still another example, the user may arrange all the input interface elements implemented by way of input fields, dropdown menus, sliders and so forth, on a single user interface tab. In yet another example, a layer of one input interface element and a layer of one output interface element can overlap each other. In still another example, the at least one user interface tab may overlap another user interface tab.

Optionally, the size of the at least one input interface element and/or the at least one output interface element is customisable.

In other words, the user may adjust the size of the at least one input interface element and/or the at least one output interface element, as per his/her interest via dragging edges of the at least one input interface element and/or the at least one output interface element, pinching and zooming-in/out of the at least one input interface element and/or the at least one output interface element, and the like. It will be appreciated that the aforesaid customisation of the size of the at least one input interface element and/or the at least one output interface element, allows for adjusting the relative arrangement of the at least one input interface element and/or the at least one output interface element Optionally, the interactive user interface enables the user to adjust an appearance of the at least one input interface element and/or the at least one output interface element. Optionally, the appearance of the at least one input interface element and/or the at least one output interface element is adjusted by way of adjusting at least one of: a theme, a color (colour), a size, a shape and a font of the at least one input interface element and/or the at least one output interface element.

In an example, the user may change the colour to adjust the appearance of the at least one input interface element and/or the at least one output interface. In another example, the user may change the theme to adjust the appearance of the at least one input interface element and/or the at least one output interface element. In yet another example the user may change font size and font style to adjust the appearance of the at least one input interface element and/or the at least one output interface element.

As mentioned previously, the at least one input interface element enables the user to input the plurality of audit parameters to be employed for the audit evidence. Optionally, the plurality of audit parameters comprises at least one of: an assurance level to be achieved, a tolerable error, a statistical sampling technique to be employed. The plurality of audit parameters act (namely function) as a basis upon which the input data is to be analysed (namely, evaluated) for obtaining the audit evidence. The "assurance level" to be achieved for a given variable relates to a level of confidence that is to be achieved pertaining to accuracy of given data values of the given variable. Therefore, higher the assurance level to be achieved for the given variable, higher the confidence that is to be achieved pertaining to accuracy of given data values of the given variable. In an embodiment, the "tolerable error" relates to an acceptable amount (namely, measure) by which a given data value of a given variable can vary from its actual (namely, real or true) value, without considerably impacting the audit evidence. In other words, the tolerable error relates to a maximum acceptable error that can be associated with the given data value, without the given data value being considered as a misstatement. In an embodiment, the "statistical sampling technique to be employed" relates to a technique that is to be employed for obtaining remaining samples that are to be subsequently analysed for obtaining the audit evidence, from among the entire population of financial and non-financial records associated with the given use case. In one case, the remaining samples include the entire population of such financial and non-financial records. In another case, the remaining samples include only a given portion (namely, only a few records) of the entire population of such financial and non-financial records. Notably, the statistical sampling technique is to be employed upon identification of the key items at (e). Examples of the statistical sampling technique to be employed include, but are not limited to, monetary unit sampling, attribute sampling, stratified sampling, variable sampling.

Optionally, the assurance level to be achieved is expressed as a percentage of assurance. In an embodiment, the assurance level to be achieved ranges from 0 percent assurance to 100 percent assurance.

Optionally, the plurality of audit parameters further comprises a combined risk assessment for the given use case, the combined risk assessment comprising at least two of: an inherent risk associated with the given use case, a control risk associated with the given use case, a detection risk associated with the given use case.

Optionally, the plurality of audit parameters further comprises the target variable and the at least one explanatory variable.

Optionally, the plurality of audit parameters further comprises a number of errors planned for, whilst obtaining the audit evidence.

In an exemplary embodiment, there may be four audit parameters to be provided by the user. Additionally, the four audit parameters to be provided may be a target variable, an explanatory variable, an assurance level and a tolerable error. In such a case, the user may choose the target variable and the explanatory variable using a first dropdown menu and a second dropdown menu, respectively. Furthermore, the user may input the assurance level using a slider, and may input the tolerable error using an input field, wherein the user provides the data in the input field manually, via a keyboard of the user device or a virtual keyboard rendered upon the interactive user interface.

The at least one output interface element enables the regression planning and evaluation system to present to the user, the regression plot representing the variation of the target variable with respect to the at least one explanatory variable. The regression plot indicates an upper acceptance bound and a lower acceptance bound with respect to the regression line. The regression plot is generated for the plurality of samples associated with the given use case based upon the input data and the plurality of audit parameters. Notably, the regression plot depicts a plurality of data points, wherein each data point corresponds to data values of the target variable and the at least one explanatory variable, for a given sample. Therefore, a number of the data points depicted in the regression plot is equal to a number of the plurality of samples associated with the given use case.

Furthermore, the term "regression line" relates to a line that models the variation of the target variable with respect to the at least one explanatory variable. In other words, the regression line is understood to be a line that best fits (namely, closely represents) a distribution of the plurality of data points, in a manner that a cumulative distance of the plurality of data points from the regression line is minimum.

It will be appreciated that the regression line could be a straight line or a curve.

Moreover, the terms "upper acceptance bound" and "lower acceptance bound" relate to a maximum acceptable limit and a minimum acceptable limit of permissible misstatements within the plurality of samples respectively, that are acceptable while obtaining the audit evidence; in other words, the bounds are thresholds that allow for distortions or inaccuracies in portions of the input data to be determined, to trigger, for example, collection of additional input data relating to the portions for addressing stochastic uncertainty associated with the portions (namely, enabling distortion reduction to be achieved by the system when generating audit evidence). Specifically, the upper acceptance bound and the lower acceptance bound define an acceptance range (or an acceptance interval) therebetween, wherein samples that fall within (namely, lie within) the acceptance range, are considered acceptable for obtaining the audit evidence (namely, samples having none or an acceptable degree of error).

Furthermore, the upper acceptance bound and the lower acceptance bound are identified based upon the input data and the plurality of audit parameters. In an example, the upper acceptance bound and the lower acceptance bound may be identified based upon the tolerable error. In such a case, greater the tolerable error, greater may be the acceptance range defined between the upper acceptance bound and the lower acceptance bound. In another example, the upper acceptance bound and the lower acceptance bound may be identified based upon the assurance level to be achieved. In such a case, greater the assurance level to be achieved, smaller may be the acceptance range defined between the upper acceptance bound and the lower acceptance bound.

Optionally, the aforesaid regression planning and evaluation system is operable to calculate the upper acceptance bound and the lower acceptance bound by employing at least one of: a mathematical formula, an artificial intelligence algorithm. Optionally, the at least one output interface element presents to the user, a calculation of the upper acceptance bound and the lower acceptance bound.

It will be appreciated that the at least one output interface element that enables the regression planning and evaluation system to present the regression plot to the user, is implemented by way of a statistical representation (or example, such as a scatter plot).

Notably, the target variable and the at least one explanatory variable belong to the set of variables. It will be appreciated that the term "target variable" may also be referred to as an "output variable" and the term "explanatory variable" may also be referred to as an "input variable".

The at least one output interface element enables the regression planning and evaluation system to present to the user, the key items, wherein the key items are identified as samples that fall outside the upper acceptance bound and the lower acceptance bound in the regression plot. Notably, the term "key items" relates to samples (and specifically, data points corresponding to the samples) depicted in the regression plot that lie outside the acceptance range defined between the upper acceptance bound and the lower acceptance bound. It will be appreciated that such key items are considered to have substantial misstatement associated therewith, and may be considered to be inacceptable audit evidence by the user.

Optionally, the at least one output interface element provides the regression plot in a manner that the key items are depicted distinctly with respect to samples that fall within the upper acceptance bound and the lower acceptance bound in the regression plot. In such a case, the at least one output interface element employs, for example, different colours, shapes, symbols, and so forth, to distinguish the key items from the samples that fall within the upper acceptance bound and the lower acceptance bound in the regression plot. Typically, the aforesaid visual dissimilarity facilitates the user to conveniently identify the key items in a glimpse.

In an example implementation of the at least one output interface element, the samples that fall within the upper acceptance bound and the lower acceptance bound in the regression plot may be depicted using yellow colour. In such a case, the key items, lying outside the upper acceptance bound and the lower acceptance bound, may be depicted using red colour.

Optionally, the at least one output interface element presents to the user, a calculation of the key items that are required to be tested, based upon the upper acceptance bound and the lower acceptance bound. Optionally, in this regard, at the interactive user interface, the aforesaid calculation of the key items is represented in form of alphanumeric text or an image.

Optionally, the at least one output interface element presents to the user, a number of the key items that are required to be tested. In such a case, the number of the key items that are required to be tested can be considered to be an output presented (for example, as text) to the user by the automated or semi-automated regression planning and evaluation system.

Optionally, the at least one output interface element presents to the user, a number of the remaining samples associated with the given use case that are to be subsequently analysed for obtaining the audit evidence. Such a number of the remaining samples is determined based upon at least one of: (i) the plurality of audit parameters, (ii) the identified key items.

Optionally, the at least one input interface element further enables the user to adjust the plurality of audit parameters for the audit evidence, and the at least one output interface element further enables the regression planning and evaluation system to iteratively present (a) and (b) to the user, for the plurality of adjusted audit parameters. When the user adjusts the plurality of audit parameters, the upper acceptance bound and the lower acceptance bound which are based upon such audit parameters, also change. As a result, the generated regression plot to be presented to the user also changes, leading to a subsequent change in the key items.

It will be appreciated that the server arrangement is configured to enable the user to adjust the assurance level to be achieved and/or the tolerable error for the audit evidence very easily and conveniently. Moreover, the server arrangement is configured to represent an effect of the adjustment of the assurance level to be achieved and/or the tolerable error for the audit evidence over the input data, thereby allowing to analyse the enormous input data in a very short time. On the other hand, if the user were to perform the steps manually after each adjustment of the assurance level to be achieved and/or the tolerable error for the audit evidence, the user would spend considerable amount of time and effort. Moreover, such manual computations would be prone to errors and inaccuracies.

In an example, the user may adjust the tolerable error using an input interface element, such as an input field.

In another example, the user may adjust the assurance level to be achieved by way of an input interface element, such as a slider. In such a case, the user may set a desired assurance level by positioning a cursor of the slider between an upper and a lower limit of the slider.

In yet another example, the user may adjust the assurance level to be achieved by way of an input interface element, such as an input field.

In still another example, the user may adjust the target variable and/or the at least one explanatory variable by way of an input interface element, such as a drop-down menu.

Optionally, the at least one input interface element provides an optimisation option that, when selected by the user, optimises the plurality of audit parameters in a manner that the number of key items that are required to be tested is reduced. Optionally, the at least one input interface element is implemented as the user selectable object, to provide the optimisation option. Notably, the optimisation option finds an optimal combination of the plurality of audit parameters that allow for generating an optimal regression plot having a minimum number of total items comprising the number of identified key items and the number of remaining samples.

It will be appreciated that when the user uses the optimization option, the regression module rapidly performs complex computations, thereby substantially reducing a time that would be required if the computations were to be performed manually. Moreover, the regression module is configured to accurately perform the computations, for example by employing adaptive reconfiguring of computing hardware used to implement the regression module (for example, by selective allocation of different types of data memory to various groups of input data or regression computations pertaining to portions of the input data).

In an example, the at least one input interface element is implemented as the user selectable object, for example such, as a user-selectable button, to provide the optimisation option. In such an example, the user-selectable button may be labelled, for example, as 'PRESET'.

Optionally, the input data comprises data values of a set of variables for the plurality of samples associated with the given use case, and wherein:

the at least one input interface element enables the user to select a variable of interest from the set of variables; and the at least one output interface element enables the regression planning and evaluation system to present to the user:

an impact of remaining variables of the set upon the variable of interest, such impact being based upon relationships existing between the variables of the set; and inter-relations that exist between the remaining variables. Notably, the "variable of interest" can be any given variable among the set of variables, whose relationships with other remaining variables of the set are to be analysed by the user. Notably, a given remaining variable is said to have a high impact on the variable of interest if there is a strong relationship between the given remaining variable and the variable of interest. Optionally, correlation coefficients between the variables of the set are calculated by using the regression planning and evaluation system, to determine the relationships existing between the variables of the set. Therefore, the impact of remaining variables of the set on the variable of interest is directly proportional to magnitude of correlation coefficients between the variable of interest and the remaining variables of the set. Furthermore, there may exist inter-relations between the remaining variables. Notably, such inter-relations may depend on the calculated correlation coefficients between the variables of the set.

Optionally, the target variable is the variable of interest.

In an example, the at least one input interface element may be implemented as a dropdown menu having a plurality of user-selectable options, each corresponding to one variable of the set of variables, for enabling the user to select the variable of interest. In such a case, the user may click on the user-selectable option corresponding to the variable of interest for making the aforesaid selection.

Optionally, the at least one output interface element is implemented by way of a solar correlation representation to present to the user:

the impact of remaining variables of the set upon the variable of interest, such impact being based upon relationships existing between the variables of the set; and the inter-relations that exist between the remaining variables.

Optionally, the solar correlation representation depicts the variable of interest to be arranged at a centre of the solar correlation representation, and a plurality of concentric orbits around the variable of interest, wherein each of the plurality of concentric orbits represents a distinct correlation coefficient, and wherein a given remaining variable is arranged in one an orbit based upon a given correlation coefficient between the given remaining variable and the variable of interest. In such a case, the plurality of concentric orbits generally represent absolute values of correlation coefficients. It will be appreciated that in such a case, a specific remaining variable can be arranged in only one orbit, whereas a given orbit representing a given correlation coefficient may depict zero, single, or multiple remaining variables therein. Notably, the given orbit may depict only those remaining variables therein that are associated with the variable of interest according to the given correlation coefficient. Furthermore, the aforesaid representation of the impact of the remaining variables on the variable of interest by way of the solar correlation representation is another pertains to the regression planning operation associated with obtaining the audit evidence. Moreover, the solar correlation representation can be understood to pertain to the regression planning information.

Optionally, the plurality of concentric orbits are arranged around the variable of interest in a manner that a distance of a given orbit from the variable of interest is inversely proportional to its corresponding correlation coefficient. In other words, a first orbit representing a first correlation coefficient is arranged farther away from the variable of interest as compared to a second orbit representing a second correlation coefficient, if the first correlation coefficient is smaller than the second correlation coefficient.

In an embodiment, eleven concentric orbits are arranged around the variable of interest, wherein the eleven concentric orbits represent 1, 0.9, 0.8, 0.7, 0.6, 0.5, 0.4, 0.3, 0.2, 0.1 and 0 correlation coefficients. In another embodiment, ten concentric orbits are arranged around the variable of interest, wherein the ten concentric orbits represent 0.9, 0.8, 0.7, 0.6, 0.5, 0.4, 0.3, 0.2, 0.1 and 0 correlation coefficients. In yet another embodiment, five concentric orbits are arranged around the variable of interest, wherein the five concentric orbits represent 0.8, 0.6, 0.4, 0.2 and 0 correlation coefficients.

As an example, in the aforesaid example describing the given use case UC having the set of eight variables V1-V8 pertaining thereto, the variable V2 may be the variable of interest and the variables V1, V3, V4, V5, V6, V7 and V8 may be the remaining variables of the set of eight variables V1-V8 having correlation coefficients 0, 0.3, 0.9, 0.5, 0.9, 0.9 and 0.7 respectively, with respect to the variable of interest V2. In such a case, a solar correlation representation SOL pertaining to the given use case UC may represent the variable V2 arranged at a centre of the solar correlation representation SOL, and ten concentric orbits arranged around the variable V2. Therefore, the variable V1 may be arranged in an orbit representing 0 correlation coefficient, the variable V3 may be arranged in an orbit representing 0.3 correlation coefficient, the variable V5 may be arranged in an orbit representing 0.5 correlation coefficient, the variable V8 may be arranged in an orbit representing 0.7 correlation coefficient, and the variables V4, V6 and V7 may be arranged in an orbit representing 0.9 correlation coefficient. It will be appreciated that in such an example, the orbits representing 0.1, 0.2, 0.4, 0.6 and 0.8 correlation coefficients, are empty.

Optionally, an arrangement of the remaining variables in the solar correlation representation represents the inter-relations that exist between such remaining variables. Optionally, in this regard, in the solar correlation representation, an arrangement of the remaining variables about the variable of interest represents the inter-relations that exist between the remaining variables. Notably, variables lying on opposite sides of the variable of interest may not be inter-related whereas variables lying on the same side of the variable of interest may be inter-related. It will be appreciated that such a manner of representing the inter-relations that exist between the remaining variables is not limited to representing inter-relations of variables lying on a same orbit only, but can also be employed for representing inter-relations of variables lying on separate orbits.

Optionally, for a plurality of remaining variables that are arranged on a same orbit of the solar correlation representation, a distance (namely, a separation) between the plurality of remaining variables is directly proportional to a degree (namely, a strength) of inter-relations that exist therebetween. As an example, three variables X1, X2 and X3 may be arranged on a single orbit, wherein the variables X1 and X3 may be arranged close to each other, and substantially away from the variable X2. In such an example, (i) the variables X1 and X3 may have a strong inter-relation there between, (ii) the variables X1 and X2 may have a weak inter-relation there between, and (iii) the variables X3 and X2 may have a weak inter-relation there between.

Optionally, the at least one output user interface implemented to depict a solar correlation can be adjusted in order to customize the appearance of the representation. Furthermore, customizing the appearance of the solar correlation can enhance the interpretation of the representation. In an example, the representation can be depicted using different colours. In an example, the representation can be depicted using different symbols.

Optionally, the at least one output interface element enables the regression planning and evaluation system to present to the user, a distribution of the data values of the variable of interest. It will be appreciated that provision of the aforesaid distribution of the data values of the variable of interest, allows for the user to understand and analyse the variable of interest in a user-friendly manner. As an example, the distribution of the data values of the variable of interest can be implemented by way of a histogram.

Optionally, in the interactive user interface:
the at least one input interface element enables the user to select, from amongst the set of variables, the target variable and the at least one explanatory variable; and
the at least one output interface element enables the regression planning and evaluation system to present to the user, a residual plot indicative of an impact of the at least one explanatory variable on the target variable, such impact being based upon the relationships existing between the variables of the set.

In an example, the at least one input interface element may provide separate input fields to enable the user to provide the target variable and at least one explanatory variable, respectively. In another example, the at least one input interface element may provide the user with user-selectable objects (such as user-selectable buttons, user-selectable icons, dropdown menus and so forth) to enable the user to select the target variable and at least one explanatory variable.

Optionally, the at least one output interface element presents the residual plot by way of a statistical representation. Optionally, in this regard, the statistical representation is a scatter plot. Notably, the "residual plot" relates to a graphical illustration of errors (namely, residuals) depicted in the regression plot with respect to predictions depicted in the regression plot. Furthermore, the residual plot is generated for the plurality of samples. Notably, the "predictions depicted in the regression plot" relate to predicted (namely, expected) values of the plurality of samples, wherein such predicted values of the plurality of samples lie along the regression line. Furthermore, the "errors depicted in the regression plot" relates to differences between an actual depiction of the plurality of samples (namely, data points) in the regression plot and the predicted values of the plurality of samples that lie along the regression line. It will be appreciated that if a given sample in the regression plot is actually depicted to lie along the regression line, an error associated with such a sample is zero. In other words, the residual plot depicts unexplained differences within the regression model, for each of the plurality of samples depicted in the regression plot.

Optionally, the at least one output interface element enables the regression planning and evaluation system to present to the user, an influence scatter plot representing an influence of the at least one explanatory variable upon the target variable, wherein the influence scatter plot is generated for the plurality of samples associated with the given use case, based upon the regression plot. Notably, such an influence scatter plot depicts the influence on one axis (for example, its vertical axis) and an index of samples on another axis (for example, its horizontal axis). It will be appreciated that samples having a large influence associated therewith, can introduce a significant bias into the aforesaid regression analysis.

Optionally, the at least one input interface element further enables the user to provide, via an influence filter, an influence range for the influence scatter plot, and the at least one output interface element further enables the regression planning and evaluation system to iteratively present the influence scatter plot to the user, for the adjusted influence range. The influence filter can be implemented by way of at least one of a user-selectable object, an input field, a slider, dropdown menu. Notably, the "influence range" relates to an acceptable range of influence values that can be associated with the plurality of samples, without substantially impacting the audit evidence. In other words, samples having influence values that lie within the influence range, are considered to have acceptable amount of influence on the aforesaid regression analysis.

Optionally, the at least one output interface element enables the regression planning and evaluation system to present to the user, an influence summary describing the influence of the at least one explanatory variable upon the target variable, for the plurality of samples associated with the given use case. Optionally, in this regard, the influence summary comprises calculated influence values pertaining to the plurality of samples. The influence summary can be implemented by at least one of table, text, or list.

Optionally, the interactive user interface comprising the at least one output interface element enables the regression planning and evaluation system to present to the user, a comprehensive summary of the audit evidence, wherein the comprehensive summary indicates at least a status of the plurality of samples, the status indicating whether or not a given sample is a key item pertaining to the audit evidence. In such a case, the comprehensive summary of the audit evidence can be implemented by at least one of table, text, or list. Notably, the comprehensive summary can be understood to be an output of the regression planning and evaluation system. It will be appreciated that the at least one output interface element allows for providing the comprehensive summary in a systematic and user-friendly manner.

DETAILED DESCRIPTION OF THE DRAWINGS

Figure 1A:
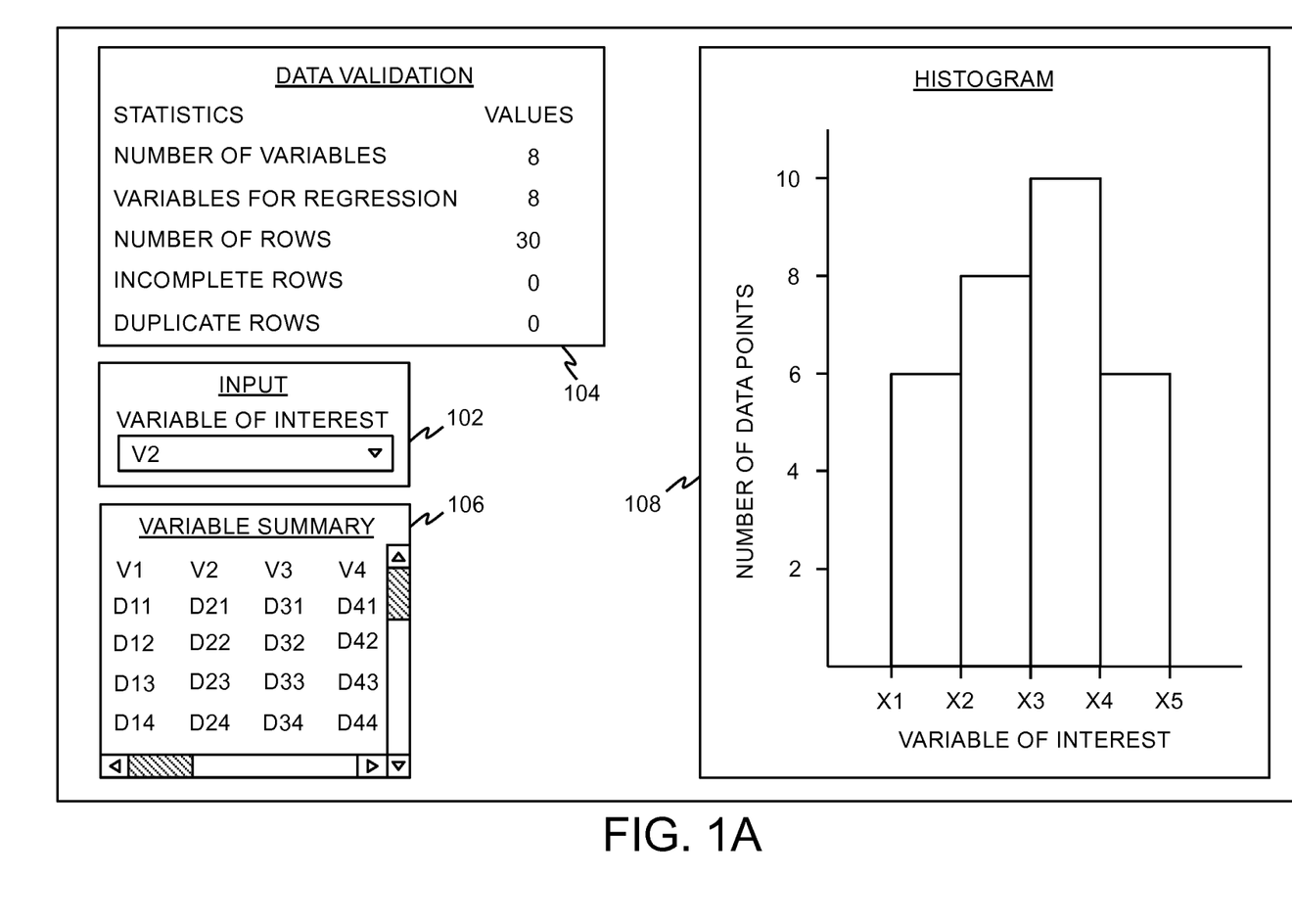
FIGS. 1A, 1B, 1C, 1D and 1E are exemplary illustrations of an interactive user interface that is presented to a user of a regression planning and evaluation system, in accordance with different embodiments of the present disclosure.

FIG. 1A is an illustration of an input interface element 102 and three output interface elements 104, 106 and 108. The input interface element 102 enables a user to select a variable of interest from a set of variables V1-V8 for a plurality of samples (for example, 30 samples) associated with a given use case; the samples can include financial data, sensor data, measurement data, but not limited thereto. The input interface element 102 is implemented by way of a drop-down menu having a plurality of user-selectable options (corresponding to each variable of the set of variables V1-V8). As shown, the user selects a user-selectable option corresponding to variable 'V2', to select the variable 'V2' as the variable of interest from among the set of variables V1-V8. The output interface element 104 presents validated input data to the user, by way of a table. Furthermore, the output interface element 106 presents a variable summary that facilitates reconciliation of the input data, by way of another table. Moreover, the output interface element 108 presents a distribution of data values of the variable of interest 'V2', by way of a statistical representation such as a histogram.

Figure 1B:
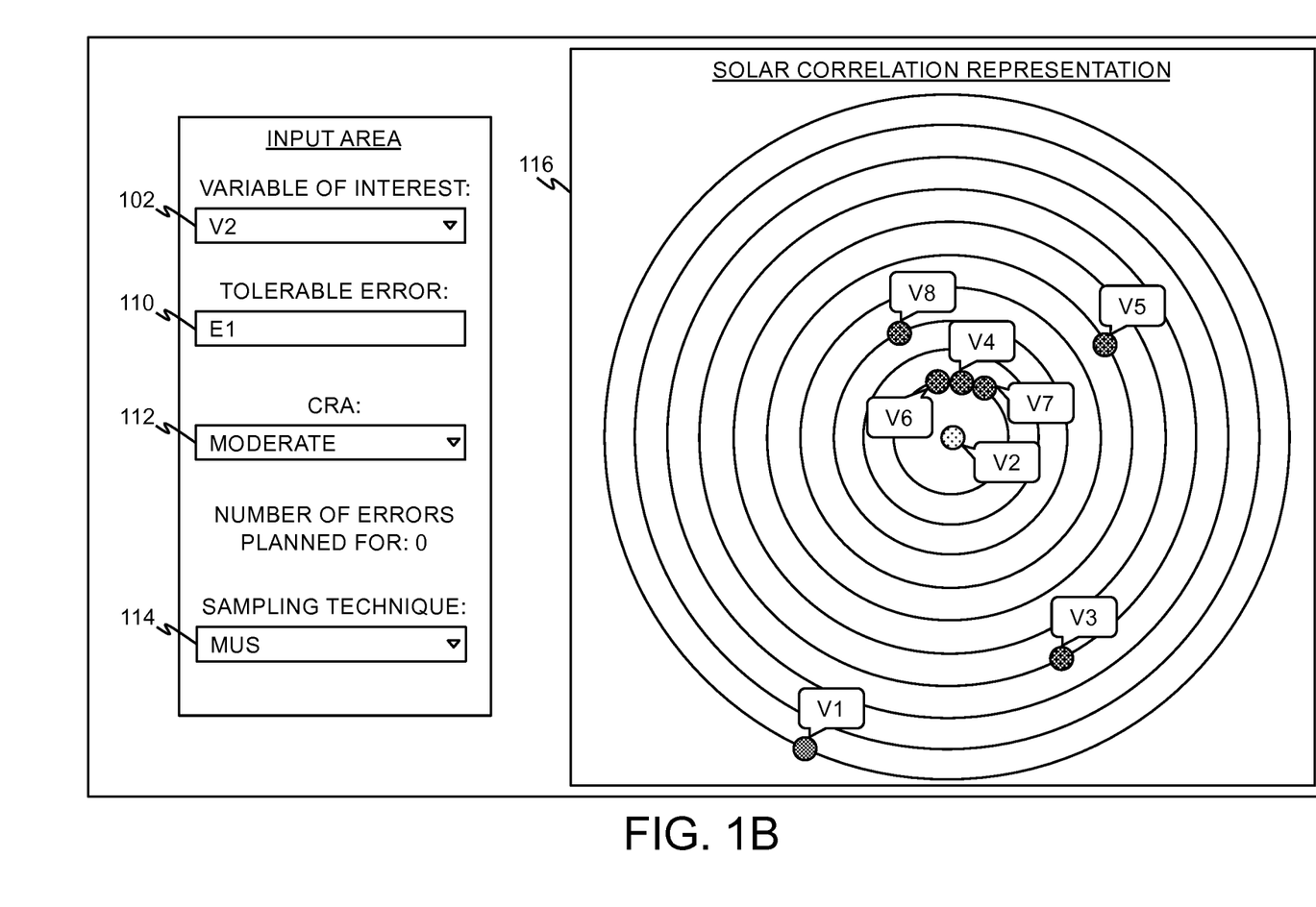

FIG. 1B is an illustration of an input area including four input interface elements 102, 110, 112 and 114, and an output interface element 116. Similar to FIG. 1A, the input interface element 102 enables the user to select the variable of interest from the set of variables for the plurality of samples associated with the given use case, by way of the dropdown menu. The input interface element 110 enables the user to input an audit parameter such as a tolerable error, via an input field. The tolerable error is a maximum acceptable error that can be associated with a given data value of a given variable among the set of variables for the plurality of samples associated with the given use case; for example, the maximum tolerance error can relate to a maximum permitted deviation in a physical parameter when seeking to ensure safety of operation of a manufacturing facility, for example operation of nuclear waste encapsulation plant, wherein the nuclear waste is to be encapsulated within Silicon Carbide shells, and wherein the waste encapsulated in Silicon Carbide shells is to be used as back-filling for exhausted coal mines. The input interface element 112 enables the user to input another audit parameter such as a combined risk assessment (CRA) by way of another drop-down menu having a plurality of user-selectable options (for example, such as 'LOW', 'MODERATE', and 'HIGH'). The input interface element 114 enables the user to input yet another audit parameter such as a statistical sampling technique to be employed, by way of yet another dropdown menu. Notably, the output interface element 116 represents an impact of remaining variables of the set (such as variables V1, V3, V4, V5, V6 and V7) upon the variable of interest V2 and inter-relations that exist between the remaining variables, by way of a statistical representation such as a solar correlation representation. The variable of interest V2 is arranged at a center of the solar correlation representation. The remaining variables are arranged in a plurality of concentric orbits around the variable of interest V2, wherein each of the plurality of concentric orbits represents a distinct correlation coefficient, and wherein a given remaining variable is arranged in an orbit based upon a given correlation coefficient between the given remaining variable and the variable of interest V2. Furthermore, the plurality of concentric orbits are arranged in a manner that a distance of a given orbit from the variable of interest V2 is directly proportional to its corresponding correlation coefficient. In such a scenario, the orbit including the variable V4 is associated with a higher correlation coefficient as compared to the orbit including the variable V5.

Figure 1C:
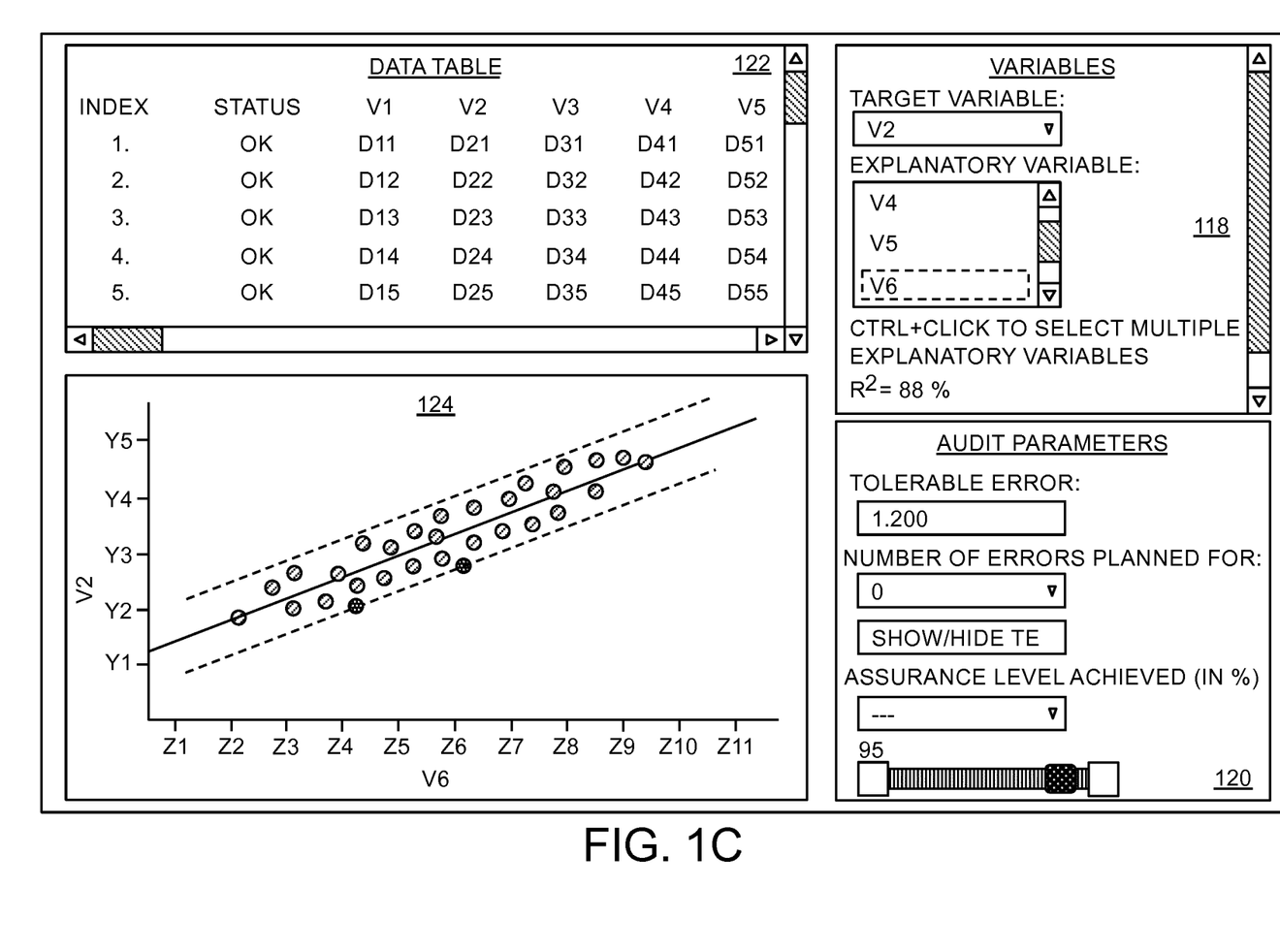

FIG. 1C is an illustration of two input interface elements 118 and 120, and two output interface elements 122 and 124. The input interface element 118 enables the user to select a target variable and at least one explanatory variable, from amongst the set of variables V1-V8, by way of two drop-down menus, each having a plurality of user-selectable options. As shown, the user selects a user-selectable option corresponding to the variable 'V2', to select the variable 'V2' as the variable of interest from among the set of variables V1-V8. Similarly, the user selects one explanatory variable by clicking a user-selectable option corresponding to the variable 'V6'. In an input area, the input interface element 120 enables the user to input a plurality of audit parameters such as a tolerable error, an assurance level and number of errors planned for. Notably, via the input interface element 120, the user can (i) input the tolerable error by way of the input field, (ii) input the assurance level by way of selection from a dropdown menu and/or adjustment of a slider, and (iii) input a number of errors planned for, by way of another dropdown menu. The output interface element 122 illustrates a representation of obtained input data, by way of a table that comprises the data values of the set of variables for the plurality of samples associated with the given use case. The output interface element 124 presents to the user, a statistical representation such as a regression plot, which represents a variation of the target variable V2 with respect to the at least one explanatory variable V6. Furthermore, the regression plot indicates an upper acceptance bound and a lower acceptance bound (depicted as dashed lines) with respect to a regression line (depicted as a solid line). Moreover, the regression plot is generated for the plurality of samples (notably, the exemplary 30 samples) associated with the given use case, based upon the input data and the plurality of audit parameters. Additionally, the regression plot depicts key items which are samples that fall outside the upper acceptance bound and the lower acceptance bound in the regression plot. Such key items are depicted by way of darkened circles in the regression plot.

Figure 1D:
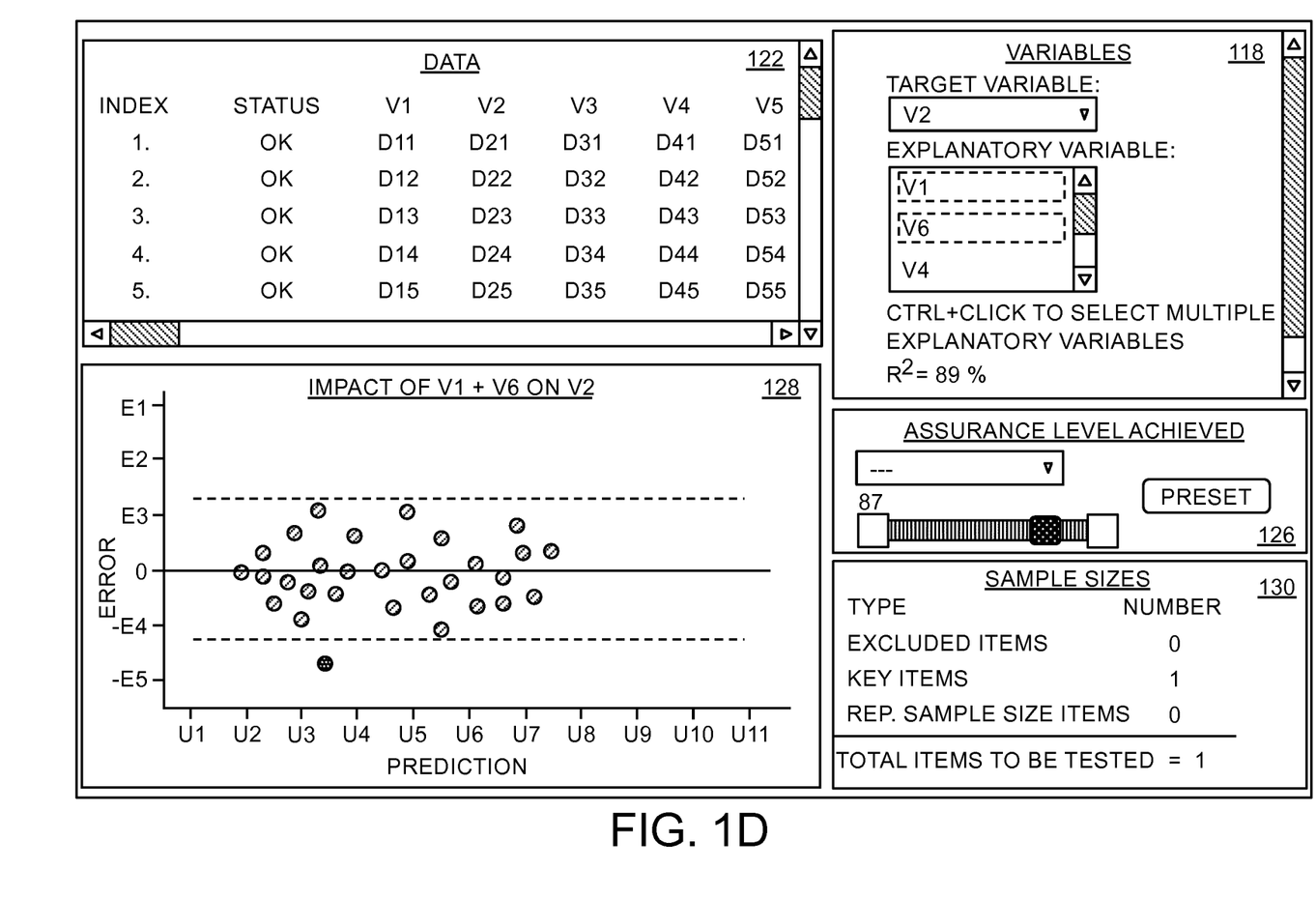

FIG. 1D is an illustration of two input interface elements 118 and 126, and three output interface elements 122, 128, and 130. In FIG. 1D, the input interface element 118 enables the user to select the target variable 'V2' and two explanatory variables V1 and V6, by way of two drop-down menus. The input interface element 126 enables the user to input an assurance level to be achieved, by way of the depicted dropdown menu and/or slider. Furthermore, the input interface element 126 provides an optimization option, by way of a user-selectable button 'PRESET', which when selected by the user, optimizes a plurality of audit parameters (such as the assurance level) in a manner that the number of key items that are required to be tested is reduced. Similar to FIG. 1C, the output interface element 122 is employed to illustrate the representation of the obtained input data, by way of the table that comprises the data values of the set of variables for the plurality of samples associated with the given use case. The output interface element 128 presents to the user, a residual plot which indicates an impact of the explanatory variables V1 and V6 on the target variable V2. Notably, such impact is based upon relationships existing between the variables of the set. The output interface element 130 presents to the user, a number of identified key items.

Figure 1E:
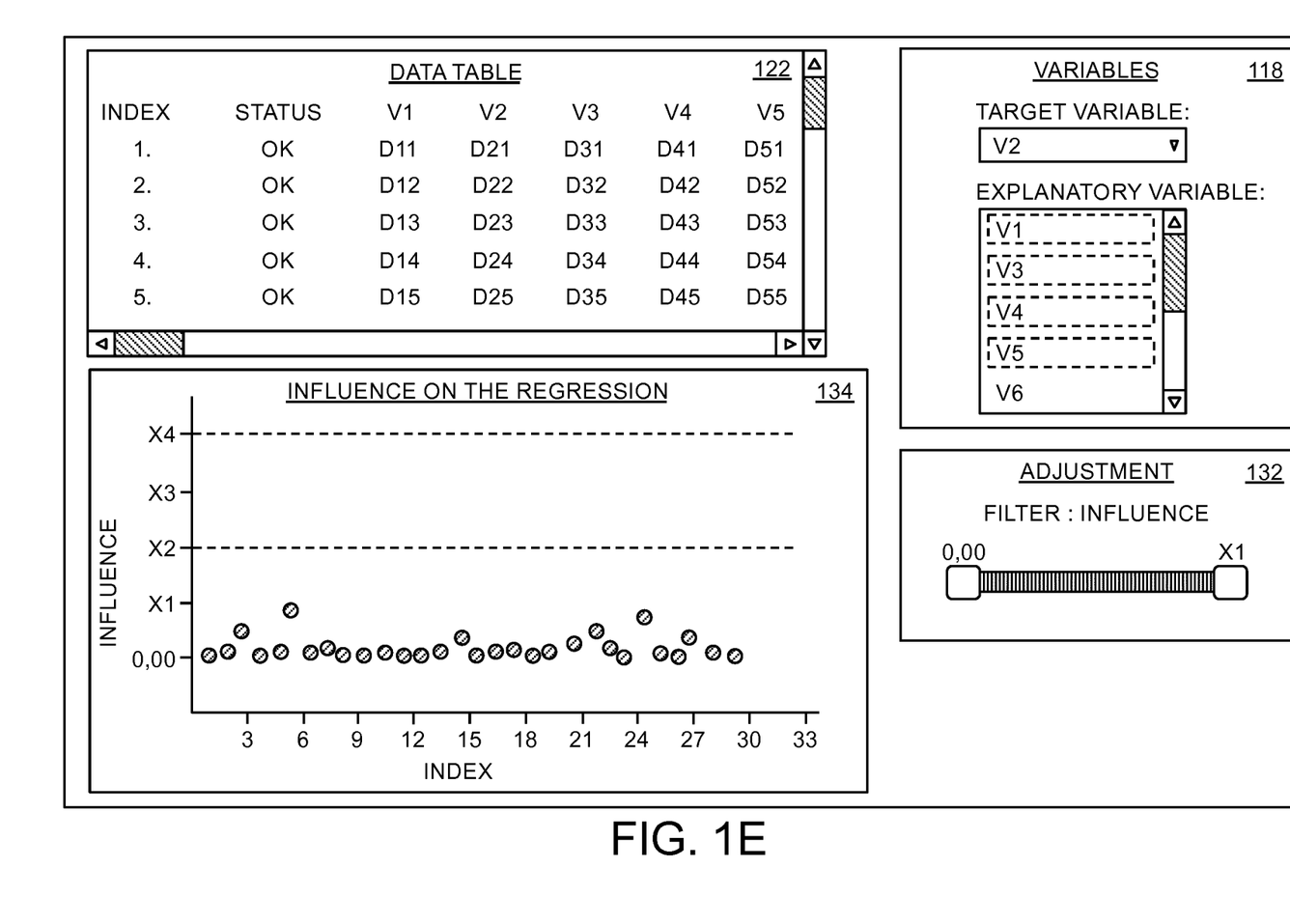

FIG. 1E is an illustration of two input interface elements 118 and 132, and two output interface elements 122 and 134. In FIG. 1E, the input interface element 118 enables the user to select the target variable 'V2' and four explanatory variables 'V1', 'V3', 'V4' and 'V5', by way of two drop-down menus. In a similar manner to FIGS. 1C and 1D, the output interface element 122 is employed to illustrate the representation of the obtained input data, by way of the table that comprises the data values of the set of variables for the plurality of samples associated with the given use case. The output interface element 134 presents to the user, an influence scatter plot which is generated for the plurality of samples associated with the given use case, based upon a regression plot. Notably, the influence scatter plot represents an influence of the at least one explanatory variable upon the target variable. Furthermore, the input interface element 132 enables the user to provide, via an influence filter that is implemented as a slider, an influence range for the influence scatter plot, and the at least one output interface element 134 iteratively presents the influence scatter plot to the user, for the adjusted influence range.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An interactive user interface of a regression planning and evaluation system, wherein the regression planning and evaluation system comprising a processor configured to execute instructions stored in a memory, is employed, when in operation, to obtain audit evidence, and wherein the audit evidence is obtained based upon input data pertaining to a given use case, wherein the input data comprises data values of a set of variables for the plurality of samples associated with the given use case, characterized in that the interactive user interface comprises:
   (i) at least one input interface element that enables the user to input a plurality of audit parameters to be employed for the audit evidence and to select a variable of interest from the set of variables, wherein the audit parameters comprise at least one of: an assurance level, a tolerable error, a statistical sampling technique, a target variable, an explanatory variable, and a combined risk assessment for the given use case,
   wherein the at least one input interface element enables the regression planning and evaluation system to:
      validate obtained input data based upon a predefined set of statistical rules, wherein the predefined set of statistical rules comprises arithmetic rules, logical rules, syntax rules, semantic rules, and a data model of a manufacturing facility;
   (ii) at least one output interface element that enables the regression planning and evaluation system to:
      (a) present to the user a regression plot representing a variation of a target variable with respect to at least one explanatory variable, wherein the regression plot indicates an upper acceptance bound and a lower acceptance bound with respect to a regression line, and wherein the regression plot is generated for a plurality of samples associated with the given use case based upon the input data and the plurality of audit parameters; and
      (b) present to the user key items, wherein the key items are identified as samples that fall outside the upper acceptance bound and the lower acceptance bound in the regression plot;
      (c) generate a plot to present to the user: an impact of remaining variables of the set upon the variable of interest, such impact being based upon relationships existing between the variables of the set; and inter-relations that exist between the remaining variables,
   wherein the at least one input interface element enables the user to adjust the plurality of audit parameters for the audit evidence, and the at least one output interface element enables the regression planning and evaluation system to iteratively present (a) and (b) to the user, for the plurality of adjusted audit parameters.

2. The interactive user interface of claim 1, characterized in that:
   the at least one input interface element is implemented by way of at least one of: a user-selectable object, an input field, a slider; and
   the at least one output interface element is implemented by way of at least one of: a table, a list, an image, text, a statistical representation.

3. The interactive user interface of claim 1 or 2, characterized in that the interactive user interface enables the user to adjust an appearance of the at least one input interface element and/or the at least one output interface element.

4. The interactive user interface of claim 1, 2 or 3, characterized in that the interactive user interface enables the user to adjust a relative arrangement of the at least one input interface element and/or the at least one output interface element.

5. The interactive user interface of any one of claims 1 to 4, characterized in that the at least one input interface element provides an optimisation option that, when selected by the user, optimises the plurality of audit parameters in a manner that the number of key items that are required to be tested is reduced.

6. The interactive user interface of any one of claims 1 to 4 or 5, characterized in that:
   the at least one input interface element enables the user to select, from amongst the set of variables, the target variable and the at least one explanatory variable; and
   the at least one output interface element enables the regression planning and evaluation system to present to the user, a residual plot indicative of an impact of the at least one explanatory variable on the target variable, such impact being based upon the relationships existing between the variables of the set.

7. The interactive user interface of any one of claim 1 to 4, 5, or 6, characterized in that the at least one output interface element enables the regression planning and evaluation system to present to the user, an influence scatter plot representing an influence of the at least one explanatory variable upon the target variable, wherein the influence scatter plot is generated for the plurality of samples associated with the given use case, based upon the regression plot.

8. The interactive user interface of any one of claims 1 to 4, 5, 6, or 7, characterized in that the at least one output interface element enables the regression planning and evaluation system to present to the user, a comprehensive summary of the audit evidence, wherein the comprehensive summary indicates at least a status of the plurality of samples, the status indicating whether or not a given sample is a key item pertaining to the audit evidence.

* * * * *